United States Patent [19]

Bianco

[11] Patent Number: 5,192,001

[45] Date of Patent: Mar. 9, 1993

[54] PUMP AND MEASURING DEVICE FOR COFFEE MACHINES WITH THREADED PISTON ROD

[75] Inventor: Carlo Bianco, Milan, Italy

[73] Assignee: Ricerca Elettromeccanica S.r.l., Milan, Italy

[21] Appl. No.: 765,905

[22] Filed: Sep. 24, 1991

[30] Foreign Application Priority Data

Jan. 25, 1991 [IT] Italy .................. MI 91 U 00064

[51] Int. Cl.⁵ ................................................ B67D 5/08
[52] U.S. Cl. ................... 222/63; 222/146.5; 222/309; 417/415
[58] Field of Search ............ 222/63, 146.5, 309, 222/333, 372; 417/415

[56] References Cited

U.S. PATENT DOCUMENTS

| 477,642 | 6/1892 | Brunthaver | 74/459 |
| 1,374,263 | 4/1921 | Watson | 222/390 |
| 3,208,388 | 9/1965 | Glasgow | 417/415 |
| 3,390,815 | 7/1968 | Kavan et al. | 222/333 |
| 3,620,134 | 11/1971 | Conlon et al. | 222/390 X |
| 3,825,155 | 7/1974 | Morault | 222/146.5 |
| 4,447,707 | 5/1984 | Baker | 222/146.5 X |
| 4,566,868 | 1/1986 | Menzies | 417/415 |
| 5,062,547 | 11/1991 | Zähner et al. | 222/333 X |
| 5,087,352 | 2/1992 | Cole | 222/309 X |

FOREIGN PATENT DOCUMENTS

| 249527 | 9/1966 | Austria | 222/309 |
| 85223 | 6/1980 | Japan | 222/309 |
| 0123380 | 9/1980 | Japan | 417/415 |

Primary Examiner—Andres Kashnikow
Assistant Examiner—Kenneth Bomberg
Attorney, Agent, or Firm—Notaro & Michalos

[57] ABSTRACT

The invention is a pump for coffee machines which simultaneously carries out the functions of water measurer and heater.

The pump consists of a cylinder with a piston inside which sucks the water from a tank and directs it towards the devices it serves, and in which there are electronic devices for the control of the run of the piston and the consequent measurement of the water. The piston is moved by a piston rod which is externally threaded and forms part of a circulating ball actuator.

Heating takes place by way of a resistance coiled around the cylinder jacket with the whole in turn enveloped by an insulating covering.

8 Claims, 2 Drawing Sheets

PUMP AND MEASURING DEVICE FOR COFFEE MACHINES WITH THREADED PISTON ROD

FIELD AND BACKGROUND OF THE INVENTION

This new invention proposes a pump and measuring device for coffee machines in particular which uses electronics to control the movement of the pump piston and which at the same time measures out the amount of water. More precisely, the pump is made of a cylinder with a piston inside which sucks the water from a tank and pumps it along an exit duct. These movements are controlled by an electronic or electromechanical device for measuring the exact amount of water to be pumped.

The device is particularly useful for small household electrical appliances, especially—though not exclusively—in coffee machines, allowing the machine to be made smaller and costing less to produce. Small electrical household appliances are well-known in which there is a device for pumping liquid that can also measure out the quantity of liquid pumped and heat it up. In these machines the various devices are autonomous and separate, particularly the pumping and measuring parts. Thus, for example, pumping may occur through a membrane pump with the water heated and measured out externally. This means that the output has to be controlled by the user or by a separate measuring device. The problems this causes are then reflected in the price and the size of the machine, both of which it would be beneficial to reduce.

SUMMARY OF THE INVENTION

Thus the new method involves a measuring pump for coffee machines in particular which pumps, measures and heats the water. This new measurer has at least one cylinder body with a piston moving inside, controlled electronically, for precise measurement of the amount of liquid sucked up and pumped out.

BRIEF DESCRIPTION OF THE DRAWINGS

There follows a detailed description giving a general example of the device with reference to the drawings wherein.

DESCRIPTION OF THE PREFERRED EMBODIMENT

Figure 1:
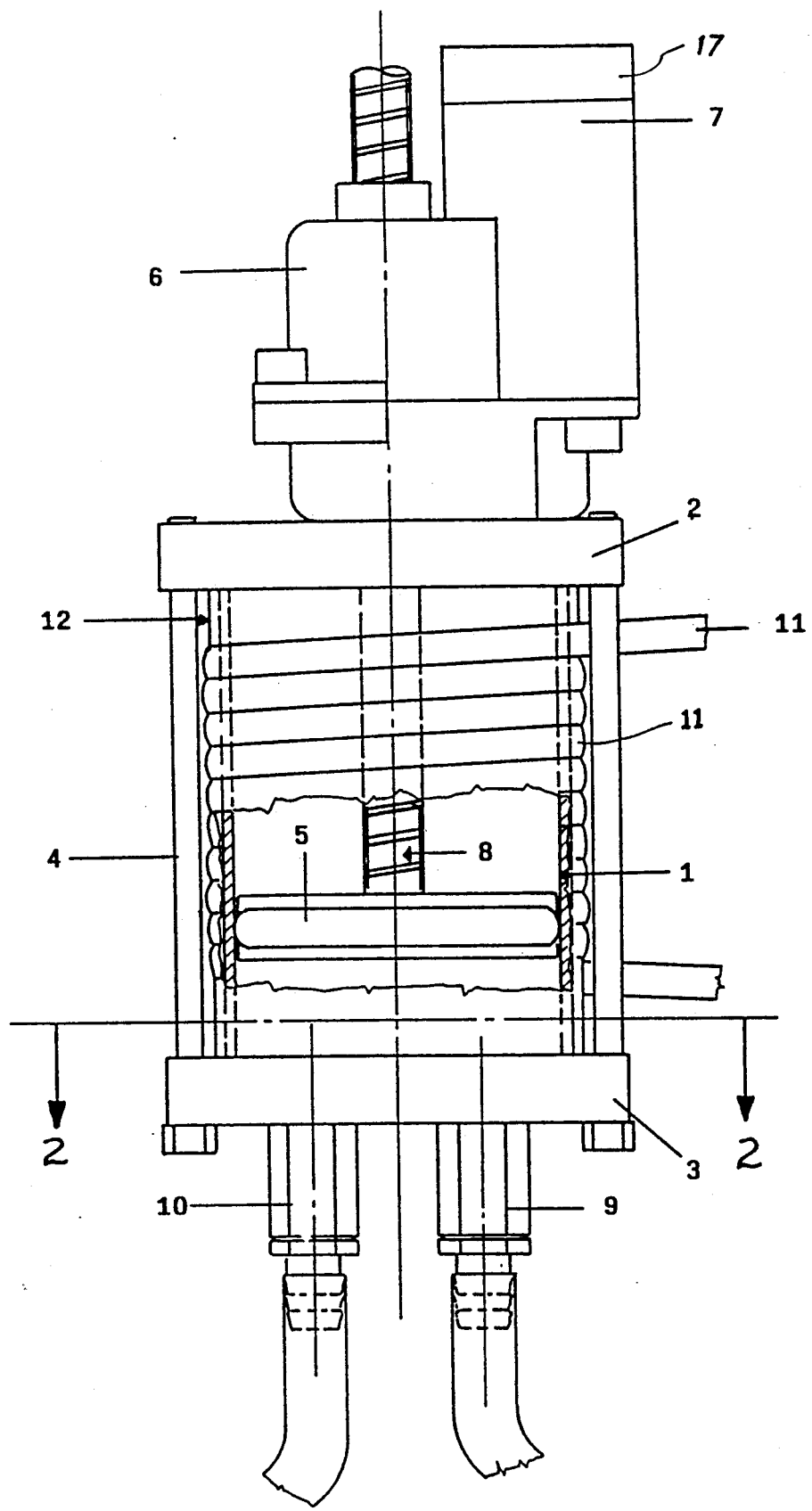
FIG. 1 is a vertical section of the pump and measurer according to the invention.

With reference to the drawings, the device is basically made up of a cylinder 1, closed at the ends by end walls 2 and 3, fixed by a brace 4 or a similar structure, and with a piston 5 running inside. The movements of the piston are controlled by an actuator 6 powered by a motor 7 which acts on the piston shaft 8. Preferably the actuator 6 is a circulating ball screw type actuator with the moving part being the appropriately externally threaded piston shaft 8. Control of the axial movement of shaft 8 is by control means which, depending on the components used may be, for example, microswitches at different points in the device that are intercepted by the shaft and connected to other machine control devices. Alternatively the motor 7 may be a stepper motor controlled electronically or a simple DC motor. In this latter case the motor is linked to an encoder 17 which controls the rotation of the motor and the movements of the shaft 8 and thus the piston 5. Encoder 17 is thus one example of control means that can be used to control axial movement of shaft 8.

Figure 2:
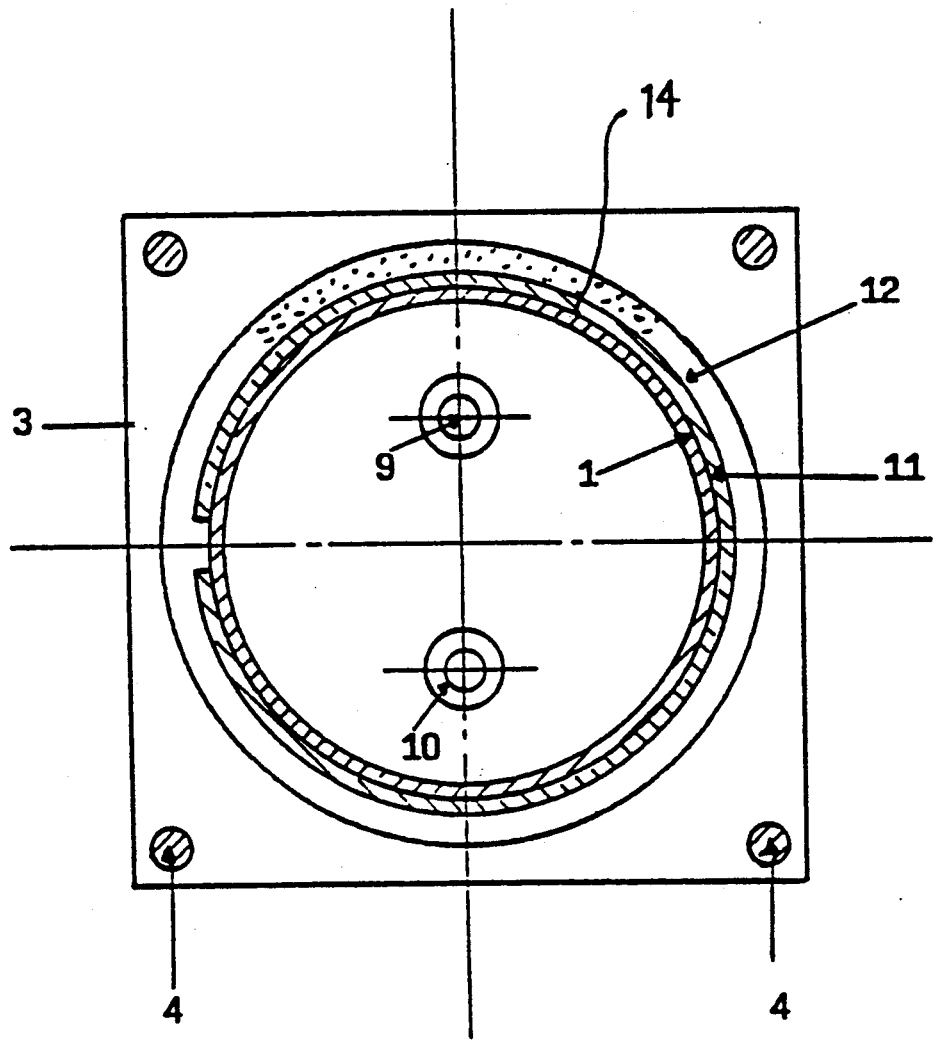
FIG. 2 is a section along line 2—2 of FIG. 1.

In the lower head wall 3 of the pump two attachments 9 and 10 are provided. The first has a valve which allows the passage of a fluid into the cylinder 1 and is connected to a water tank. The second is a delivery attachment with a valve of a well-known type which allows the fluid to leave cylinder 1. The cylinder 1 will preferably be anodized on its external surface 14 in FIG. 2, so as to be insulated electrically and with heating means in the form of a resistance element 11 coiled around it and made of, for example, a number of turns of nickel-chrome. Preferably the cylinder with the resistance element will then be covered in a layer 12 of appropriate thermoinsulating material.

From this description use of the device should also be clear. Once the volume of water to be used has been determined, the motor 7 is started which also starts the actuator 6 which moves shaft 8 upwards with the piston 5. The distance of the movement, which is a function of the volume of water sucked, is controlled by either microswitches or encoders connected to the motor, depending on the type of device used.

Once the necessary volume of water has been sucked the resistance 11 is powered up until the required temperature is reached after which the motor 7 is activated to turn in the opposite direction, pumping the water through the exit duct 10. During the suction phase the return prevention valve in the exit duct 10 remains closed while during the pumping phase the valve in the suction duct 9 is closed.

The measuring device described has various advantages, the main one being that it is extremely compact. This means that the amount of water used can be set previously and measured out automatically, thus eliminating the need to use a separate measuring device and allowing the pumping, measuring and heating units to be enclosed in a single block. The unit is thus a very simple and cheap construction as well as being easy to fit into all small household electrical appliances.

An expert in the field may imagine a variety of different ways of putting this idea into practice within the range of the invention itself. Similarly, the dimensions may vary according to the use to which the invention is put, as may the materials.

I claim:

1. A measuring pump for small electrical household appliances, comprising:
    a cylinder (1) having opposite ends;
    a first end wall (2) fixed to and closing one end of said cylinder;
    a second end wall (3) fixed to and closing an opposite end of said cylinder;
    a circulating ball screw type actuator (6) mounted to said first end wall, said actuator having an externally threaded piston shaft (8) extending therethrough and moveable by actuation of said actuator, said piston shaft extending through said first end wall and into said cylinder;
    a piston (5) mounted for sliding movement in said cylinder and directly connected to said piston shaft for movement of said piston with actuation of said actuator;
    motor means (7) operatively connected to said actuator for actuating said actuator to move said piston shaft and piston in said cylinder;

heating means closely engaged around said cylinder for heating said cylinder;

an exit duct (10) communicating with an interior of said cylinder for discharging liquid from said cylinder with movement of said piston in one direction; and a suction duct (9) communicating with the interior of said cylinder for supplying liquid into said cylinder with movement of said piston in an opposite direction.

2. A pump according to claim 1, wherein said actuator (6) is directly mounted to said first end wall (2), said motor means comprising a motor (7) mounted to said actuator.

3. A pump according to claim 2, wherein said exit duct and said suction duct are both connected to said second end wall (3) for communicating with an interior space of said cylinder (1) on one side of said piston (5), said piston shaft (8) being directly connected to an opposite side of said piston.

4. A pump according to claim 3, wherein said heating means comprises a heating coil (11) engaged around said cylinder and a layer of insulation around said heating coil and cylinder.

5. A pump according to claim 4, wherein said heating coil comprises a resistance element coil.

6. A pump according to claim 5, including bracket means (4) connected between said first and second end walls (2, 3) for holding said end walls to said cylinder, said bracket means being outside said cylinder, said coil and said insulation layer.

7. A pump according to claim 6, including control means connected to said motor for controlling actuation of said actuator and movement of said piston.

8. A pump according to claim 7, wherein said control means comprises an encoder (17) connected to said motor.

* * * * *